Dec. 11, 1951     P. S. HARDY     2,577,891
ELEVATING TRAVELING CONVEYER
Filed Sept. 14, 1948
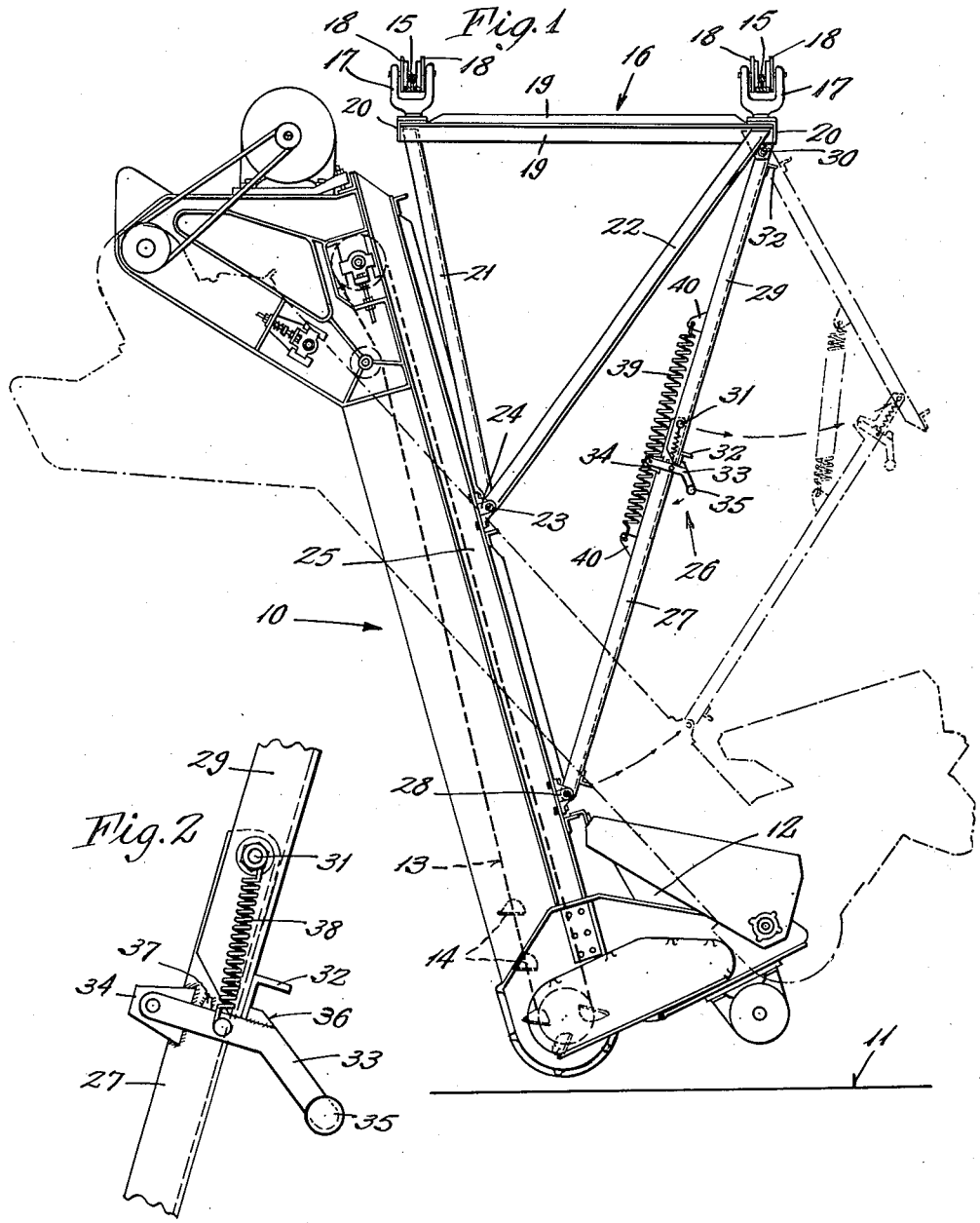
INVENTOR.
Peter S. Hardy
BY
Johnson and Kline
ATTORNEYS Patented Dec. 11, 1951

2,577,891

UNITED STATES PATENT OFFICE 2,577,891

ELEVATING TRAVELING CONVEYER

Peter S. Hardy, Bridgeport, Conn.

Application September 14, 1948, Serial No. 49,230

12 Claims. (Cl. 198—118)

This invention relates to traveling overhead conveyors for receiving material from points adjacent the floor level, and delivering it to locations substantially elevated above the floor.

The invention is concerned with improvements in the conveying apparatus for foundries, disclosed and claimed in my copending application Serial No. 765,476 filed August 1, 1947, and now abandoned entitled "Molders Sand Cutting and Conveying."

In the device of this copending application an elevating conveyor is supported above the floor surface by a supporting frame or carriage which travels on overhead tracks whereby the conveyor may be shifted to different locations in the foundry, to lift sand from points adjacent the floor to elevated hoppers. The elevating conveyor of this device is maintained in a predetermined upwardly extending, fixed angular position by the supporting frame which rides on the overhead tracks, and the lower end of the conveyor can not be raised with respect to the floor, to enable it to clear objects resting on the floor, for example, when it is being shifted to different locations.

According to the present invention this limitation of the apparatus of my copending application is overcome, by the provision of a novel, improved support for the elevating conveyor whereby its lower end may be swung upward, away from the floor, to enable it to clear objects on the floor, when the conveyor is to be shifted to a different location.

It is accordingly an object of the invention to provide an improved, pendent elevating conveyor structure and support therefor, which structure may be securely locked and rigidly held in upwardly extending operative position wherein its lower end is adjacent the floor surface and wherein it is firmly supported for operation, the said structure being quickly and conveniently swingable from said operative position so as to raise its lower end away from the floor surface, thereby to clear objects supported on said surface.

Another object of the invention is to provide an improved pendent elevating conveyor structure as characterized above, which is extremely simple and sturdy in construction, and is economical to fabricate.

Still another object of the invention is to provide an improved elevating conveyor according to the above, which is very easy to operate to raise the lower end of the conveyor from the floor surface, despite the weight of the conveyor.

Yet another object of the invention is to provide an improved elevating conveyor characterized as above, which after being operated to raise its lower end from the floor surface, will automatically again become locked in its operative position upon being shifted back thereto, the locking means being however readily releasable by a simple movement continuation of which swings the conveyor upward to clear objects on the floor surface.

A feature of the invention is the provision of an improved conveying and supporting means as above, which may be made from few and simple structural elements such as angle irons and the like, which are readily available commercially.

Other features and advantages will hereinafter appear.

In the accompanying drawings:

Figure 1 is a side elevational view of a conveying apparatus embodying the invention, and Fig. 2 is an enlarged detail of the knuckle or pivot of a novel toggle joint interconnecting the elevating conveyor with its supporting frame.

The conveying apparatus shown comprises a conventional type of elevating belt or chain conveyor 10 adapted to be carried in an angular, upwardly extending position above the floor surface 11, spaced from the latter.

The elevating conveyor 10, which may be constructed as disclosed in my copending application above referred to, has a hopper 12 in which material such as sand from a broken up mold may be deposited, the sand passing to a continuous chain 13 having buckets 14 whereby it is lifted and carried to the top of the conveyor.

According to the present invention a novel, improved supporting structure is provided for the conveyor 10 whereby the latter may be carried in the operative position shown above the floor surface 11, and may be suspended from overhead rails 15 and shifted therealong to different locations in the foundry, the supporting means being so organized that it very rigidly and sturdily supports the conveyor in operative position and yet is itself quickly and easily operable to swing the conveyor from said position and cause the lower end thereof to be raised and moved away from the floor surface 11, thereby to clear objects supported on said surface.

As shown, this supporting means comprises a carriage 16 formed of angle irons or similar structural members, the carriage having U-shaped brackets 17 mounting wheels 18 which ride on the tracks or rails 15.

While only two sets of brackets 17 and associated wheels 18 are shown in the drawing for simplicity of illustration, it will be understood that there are at least four sets, two sets being on each rail 15, and that all of the four brackets 17 and the wheels 18 carried thereby are mounted on the carriage 16, the latter being rectangular in configuration as viewed from above. The carriage 16 may be made in any desired manner, and as shown comprises bars formed of iron angles 19 located back-to-back, each pair of angles constituting a transverse structural member extending between the rails 15. The iron angles 19 at their extremities are connected together by longitudinally extending angles 20, which constitute the front and rear structural members of the carriage.

A plurality of angle bars 21 extends angularly downward from the rear ends of the transverse members 19 of the carriage 16, and a second plurality of angle bars 22 extends angularly downward and rearward from the front ends of the transverse members 19, the lower extremities of the members 21 and 22 of each pair being connected together by a pintle bar 23 which passes through brackets 24 secured to the rigid frame structure 25 of the conveyor 10. By this organization a pivotal connection is provided between the depending structural members 21 and 22 (at the lower extremities thereof) and the conveyor frame 25 intermediate the ends of the latter. This pivotal connection enables the conveyor 10 to be swung about the pintle 23 to a position (shown in broken outline) wherein the lower end of the conveyor is raised a substantial distance above the floor surface 11. It will be understood that the conveyor 10 may be shifted to other positions than that shown, wherein the end is either higher or lower than indicated.

In accordance with the invention a novel, simplified locking and actuating mechanism is provided, interconnected between the conveyor 10 and its supporting structure, whereby the conveyor may be quickly and conveniently, securely locked and rigidly held in the upright operative position shown, yet may be easily and quickly released and shifted to elevate the lower end thereof higher above the floor, to clear objects supported on the floor. This means comprises a toggle joint 26 consisting of a plurality of iron angle bars 27 pivotally connected to the conveyor frame 25 by means of brackets 28 and pivots, and further consists of a plurality of iron angle bars 29 pivotally connected to the front portions of the carriage 16 at 30, the bars 27 and 29 being pivotally connected together by pins 31 at their adjacent ends.

The angle bars 29 are connected together by cross members 32 adjacent their extremities, the said members being also in the form of angle bars as may be readily seen. Actually, the toggle joint 26 is thus constituted of a plurality of toggle joints, which are interconnected to act simultaneously as a single toggle joint.

The pivot pins 31 are located a short distance from the lower extremities of the angle bars 29, and by this organization the cross members 32 at the lower extremities of the bars 29 are engageable with upper portions of the toggle bars 27 to cooperate therewith and function as stops. It is thus seen that the pivotal connection between the toggle bars 27 and 29 is in the form of a knee joint, since the toggle bars may be swung to the left from the broken line positions shown in Fig. 1 to the full line position shown (wherein they are aligned with each other) but may not be swung further to the left beyond the said aligned positions.

By the present invention a novel latch is provided whereby the toggle joint may be automatically locked when the bars thereof are shifted into alignment with each other, and may be easily and quickly released and the toggle bars simultaneously shifted to cause a raising of the lower end of the conveyor 10. This improved latch comprises a plurality of latch arms 33 pivotally carried by plates 34 secured to the toggle bars 27 adjacent their upper extremities. The latch arms 33 are connected together by a cross bar 35, and have camming surfaces 36 engageable with the cross member 32 of the upper toggle bars 29 whereby the latch arms are cammed downward when the toggle bars are shifted toward their aligned positions. The toggle bars 27 have stops 37 against which the latch arms 33 are normally held by helical extension springs 38 when not locking the toggle members 27 and 29.

To facilitate the operation of swinging the conveyor 10 to raise the lower end thereof, a helical extension spring 39 is provided, having its ends connected to plate 40 respectively secured to the toggle bars 27 and 29. When the toggle joint is in alignment as shown, the spring 39 is under tension; if the toggle should be released by pulling the latch arms 33 downward the spring 39 will break the toggle and cause the conveyor 10 to swing counterclockwise wherein the lower end thereof will be raised to the position shown in the broken outline in Fig. 1.

It will be seen that the swinging of the conveyor 10 to raise the lower end thereof may be very easily and quickly accomplished, since it is merely necessary for an operator to grasp the handle or bar 35 of the latch arms and pull the handle downward and to the right. This will first unlock the toggle joint whereupon the spring 39 will come into action and will assist in the movement of the handle 35 and toggle bars 27 and 29 to the right until they reach the broken line position shown. Thus the swinging of the conveyor to raise the lower end is practically an effortless operation. Moreover, when it is desired to return the conveyor to the operative position shown by the full lines in Fig. 1, it is merely necessary to push the handle 35 to the left until the toggle bars 27 and 29 are aligned, and then release the handle while maintaining the toggle bars in alignment. This operation is aided by the weight of the conveyor 10, as will be readily understood, and therefore both operations may be carried out with a minimum of effort.

Variations and modifications may be made within the scope of this invention and portions of the improvements may be used without others.

I claim:

1. In an apparatus for conveying materials, an elevating conveyor extending upward from a point adjacent a floor surface; a depending conveyor-supporting structure spaced and located above said floor surface; overhead tracks; means carrying said supporting structure on the tracks for movement along the same; a pivotal connection between the supporting structure and the conveyor whereby the latter is carried above the floor surface and is swingable to move its lower end toward and away from said surface; and a toggle joint connected between the supporting structure and the conveyor, maintaining the latter in operative, upward extending position with its lower end close to the floor surface, said joint when broken enabling the conveyor to be swung whereby the lower end thereof may be moved upward away from the floor surface to clear objects supported on said surface.

2. In an apparatus for conveying materials, an elevating conveyor extending upward from a point adjacent a floor surface; a depending conveyor-supporting structure spaced and located above said floor surface; a pivotal connection between the supporting structure and the conveyor whereby the latter is carried above the floor surface and is swingable to move its lower end toward and away from said surface; a toggle joint connected between the supporting structure and the conveyor, controlling the arcuate position of the conveyor; releasable means locking the toggle joint in a predetermined position to maintain the conveyor in operative, upward extending position with its lower end close to the floor surface, said means when released freeing the toggle joint whereby the lower end of the conveyor may be swung upward away from the floor surface to clear objects supported on said surface; and means interconnecting the frame and conveyor, tending to swing the latter in a direction to raise its lower end when the toggle joint is out of alignment.

3. In an apparatus for conveying materials, an elevating conveyor extending upward from a point adjacent a floor surface; a depending conveyor-supporting structure spaced and located above said floor surface; a pivotal connection between the supporting structure and the conveyor frame whereby the latter is carried above the floor surface and is swingable to move its lower end toward and away from said surface; a toggle joint connected between the supporting structure and the conveyor frame, controlling the arcuate position of the conveyor; and releasable means comprising a latch, and comprising stops on the toggle joint, locking the latter in extended, aligned position to maintain the conveyor in operative, upward extending position with its lower end close to the floor surface, said means when released freeing the toggle joint whereby it may be broken to enable the lower end of the conveyor to be swung upward away from the floor surface, to clear objects supported on said surface.

4. In an apparatus for conveying materials, an elevating conveyor extending upward from a point adjacent a floor surface and having a rigid, elongate conveyor frame; a depending conveyor-supporting structure spaced and located above said floor surface, comprising a plurality of rigid, inverted triangular frames; a plurality of pivotal connections between said triangular frames and the conveyor frame whereby the conveyor is carried above the floor surface and is swingable to move its lower end toward and away from said surface; a toggle joint connected between the triangular frames and the conveyor frame, controlling the arcuate position of the conveyor; and releasable means locking the toggle joint in a predetermined position to maintain the conveyor in operative, upward extending position with its lower end close to the floor surface, said means when released freeing the toggle joint whereby the lower end of the conveyor may be swung upward away from the floor surface to clear objects supported on said surface.

5. In an apparatus for conveying materials, an elevating conveyor extending upward from a point adjacent a floor surface; a depending conveyor-supporting structure spaced and located above said floor surface, comprising a plurality of rigid, inverted triangular frames; a plurality of pivotal connections between the triangular frames and the conveyor whereby the latter is carried above the floor surface and is swingable to move its lower end toward and away from said surface; a plurality of toggle joints connected together for simultaneous movement and connected between the triangular frames and the conveyor, controlling the arcuate position of the conveyor; and releasable means locking the toggle joints in predetermined positions to maintain the conveyor in operative, upward extending position with its lower end close to the floor surface, said means when released freeing the toggle joints whereby the lower end of the conveyor may be swung upward away from the floor surface to clear objects supported on said surface.

6. In an apparatus for conveying materials, an elevating conveyor extending upward from a point adjacent a floor surface; a depending conveyor-supporting structure spaced and located above said floor surface; overhead tracks; means carrying said supporting structure on the tracks for movement along the same; a pivotal connection between the supporting structure and the conveyor whereby the latter is carried above the floor surface and is swingable to move its lower end toward and away from said surface; a toggle joint connected between the supporting structure and the conveyor, controlling the arcuate position of the conveyor; and releasable means locking the toggle joint in predetermined position to maintain the conveyor in operative, upward extending position with its lower end close to the floor surface, said means when released freeing the toggle joint whereby the lower end of the conveyor may be swung upward away from the floor surface to clear objects supported on said surface.

7. In an apparatus for conveying materials, an elevating conveyor extending upward from a point adjacent a floor space; a depending conveyor-supporting structure spaced and located above said floor surface; a pivotal connection between the supporting structure and the conveyor whereby the latter is carried above the floor surface and is swingable to move its lower end toward and away from said surface; a toggle joint connected between the supporting structure and the conveyor, controlling the arcuate position of the conveyor; and releasable means locking the toggle joint in a predetermined position to maintain the conveyor in operative, upward extending position with its lower end close to the floor surface, said means when released freeing the toggle joint whereby the lower end of the conveyor may be swung upward away from the floor surface to clear objects supported on said surface.

8. In an apparatus for conveying materials, an elevating conveyor extending upward from a point adjacent a floor surface; a depending conveyor-supporting structure spaced and located above said floor surface; a pivotal connection between the supporting structure and the conveyor whereby the latter is carried above the floor surface and is swingable to move its lower end toward and away from said surface; a toggle joint comprising a pair of toggle bars connected between the supporting structure and the conveyor, controlling the arcuate position of the conveyor; releasable means including stops on the toggle bars, and including a latch arm pivotally carried by one toggle bar, locking the toggle bars in aligned positions to maintain the conveyor in operative, upward extending position with its lower end close to the floor surface, said means when released freeing the toggle joint whereby the lower end of the conveyor may be swung upward away from the floor surface to clear objects supported on said surface.

9. In an apparatus for conveying materials, an elevating conveyor extending upward from a point adjacent a floor surface; a depending conveyor-supporting structure spaced and located above said floor surface; a pivotal connection between the supporting structure and the conveyor whereby the latter is carried above the floor surface and is swingable to move its lower end toward and away from said surface; a toggle joint comprising a pair of toggle bars connected between the supporting structure and the conveyor, maintaining the latter in operative, upward extending position with its lower end close to the floor surface, said joint when broken enabling the conveyor to be swung whereby the lower end thereof may be moved upward away from the floor surface to clear objects supported on said surface; and means including an extension spring interconnecting the toggle bars, tending to swing the conveyor in a direction to raise its lower end when the toggle joint is out of alignment.

10. In an apparatus for conveying materials, an elevating conveyor extending upward from a point adjacent a floor surface; a depending conveyor-supporting structure spaced and located above said floor surface; a pivotal connection between the lower portion of the supporting structure and the conveyor intermediate the ends of the latter whereby the conveyor is carried above the floor surface and is swingable to move its lower end toward and away from said surface; a toggle joint connected between the supporting structure and the conveyor adjacent the lower end thereof, controlling the arcuate position of the conveyor; and means holding the toggle joint in a predetermined position to maintain the conveyor in operative, upward extending position with its lower end close to the floor surface, said means being operable to free the toggle joint whereby the lower end of the conveyor may be swung upward away from the floor surface to clear objects supported on said surface.

11. In an apparatus for conveying materials, an elevating conveyor extending upward from a point adjacent a floor surface and sloping backward; a depending conveyor-supporting structure in front of the conveyor, spaced and located above said floor surface; a pivotal connection between the lower portion of the supporting structure and the conveyor intermediate the ends of the latter whereby the conveyor is carried above the floor surface and is swingable to move its lower end forward and upward, or backward and downward; a toggle joint located in front of the conveyor and supporting structure and connected therebetween, said toggle joint controlling the arcuate position of the conveyor; and means holding the toggle joint in a predetermined position to maintain the conveyor in operative, upward extending position with its lower end close to the floor surface, said means being operable to free the toggle joint whereby the latter is foldable forwardly to cause the lower end of the conveyor to swing forward and may be swung upward away from the floor surface, thereby to clear objects supported on said surface.

12. In an apparatus for conveying materials, an elevating conveyor extending upward from a point adjacent a floor surface; a depending conveyor-supporting structure spaced and located above said floor surface; overhead tracks; means carrying said supporting structure on the tracks for movement along the same; a pivotal connection between the supporting structure and the conveyor frame whereby the latter is carried above the floor surface and is swingable to move its lower end toward and away from said surface; a toggle joint connected between the supporting structure and the conveyor frame, controlling the arcuate position of the conveyor; and releasable means comprising a latch, and comprising stops on the toggle joint, locking the latter in extended, aligned position to maintain the conveyor in operative, upward extending position with its lower end close to the floor surface, said means when released freeing the toggle joint whereby it may be broken to enable the lower end of the conveyor to be swung upward away from the floor surface, to clear objects supported on said surface during movement of said supporting structure along said tracks.

PETER S. HARDY.

REFERENCES CITED

The following references are of record in the file of this patent:

UNITED STATES PATENTS

| Number | Name | Date |
|---|---|---|
| 734,371 | Schuler | July 21, 1903 |
| 1,361,653 | Wilkins et al. | Dec. 7, 1920 |
| 1,478,812 | Barene | Dec. 25, 1923 |
| 1,748,124 | Goldberg | Feb. 25, 1930 |
| 1,841,729 | Hauge | Jan. 19, 1932 |
| 1,896,587 | Lambert | Feb. 7, 1933 |
| 2,008,553 | Keller | July 16, 1935 |
| 2,029,179 | Marlowe | Jan. 28, 1936 |

FOREIGN PATENTS

| Number | Country | Date |
|---|---|---|
| 5,068 of 1899 | Great Britain | Dec. 8, 1899 |